United States Patent [19]

Raczynski

[11] 4,447,859

[45] May 8, 1984

[54] MODULAR FLASH SYSTEM

[75] Inventor: Walter V. Raczynski, Chicago, Ill.

[73] Assignee: Inverse Square Systems Incorporated, Chicago, Ill.

[21] Appl. No.: 444,718

[22] Filed: Nov. 26, 1982

[51] Int. Cl.³ .............................................. G03B 15/02
[52] U.S. Cl. ...................................... 362/13; 362/11; 362/12; 362/18; 362/236; 362/247; 362/250; 362/285; 362/319; 362/362; 362/368
[58] Field of Search ................... 362/13, 11, 12, 18, 362/236, 247, 250, 285, 319, 362, 368

[56] References Cited

U.S. PATENT DOCUMENTS 4,302,800 11/1981 Pelletier ............................. 362/250

Primary Examiner—Stephen J. Lechert, Jr.
Attorney, Agent, or Firm—Dithmar, Stotland, Stratman & Levy

[57] ABSTRACT

A modular photographic flash system includes a plurality of housings, some possibly empty and some containing flash units, interconnected to form a desired flash unit array. Each housing includes a hollow cylindrical member substantially square in transverse cross-sectional outline with two adjacent walls having dovetail tongues thereon and the other two walls having dovetail grooves to accommodate interfitting of adjacent housings. A latch member is movable into and out of each dovetail groove for engagement in an associated slot in the tongue interfitted therewith, the latch being operated by a spring-biased actuator rod carried in a channel formed in the inner surface of the housing.

33 Claims, 13 Drawing Figures

U.S. Patent  May 8, 1984  Sheet 1 of 3  4,447,859
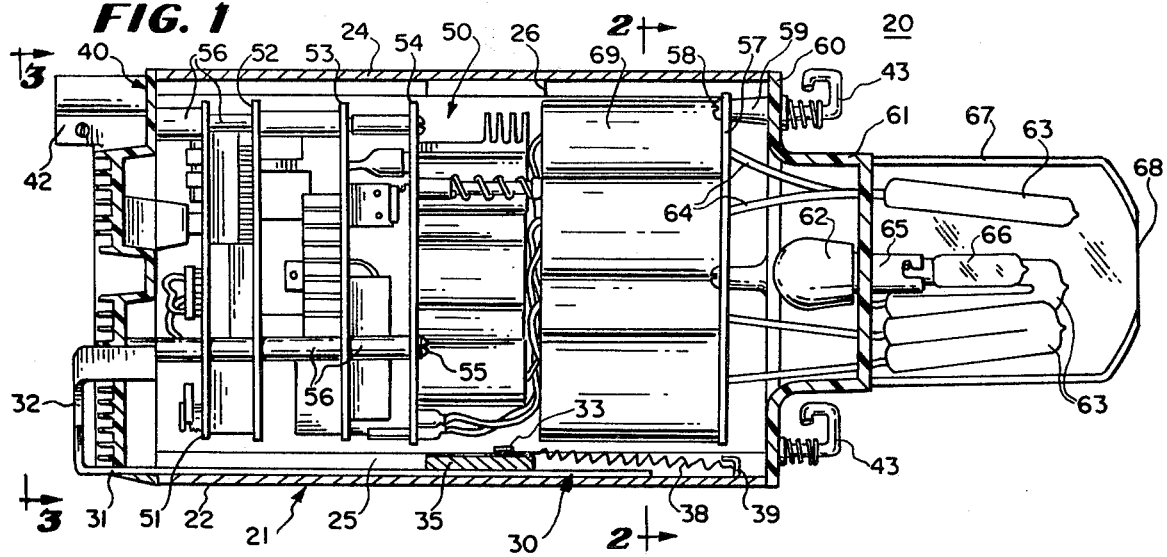
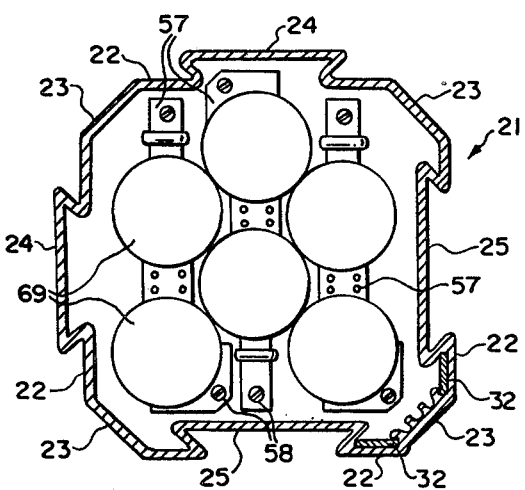
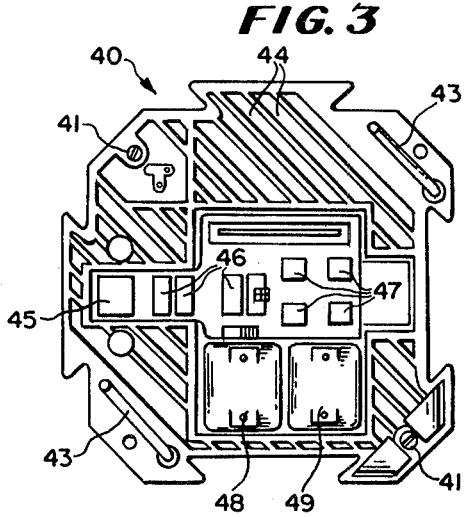
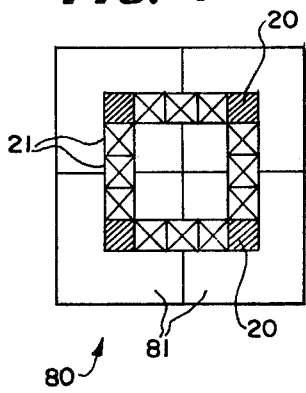
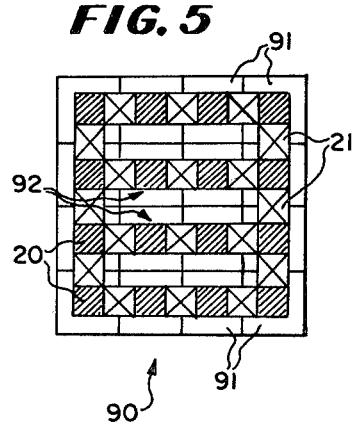
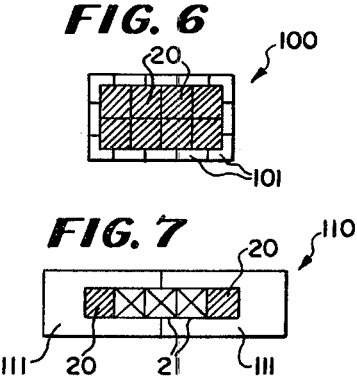

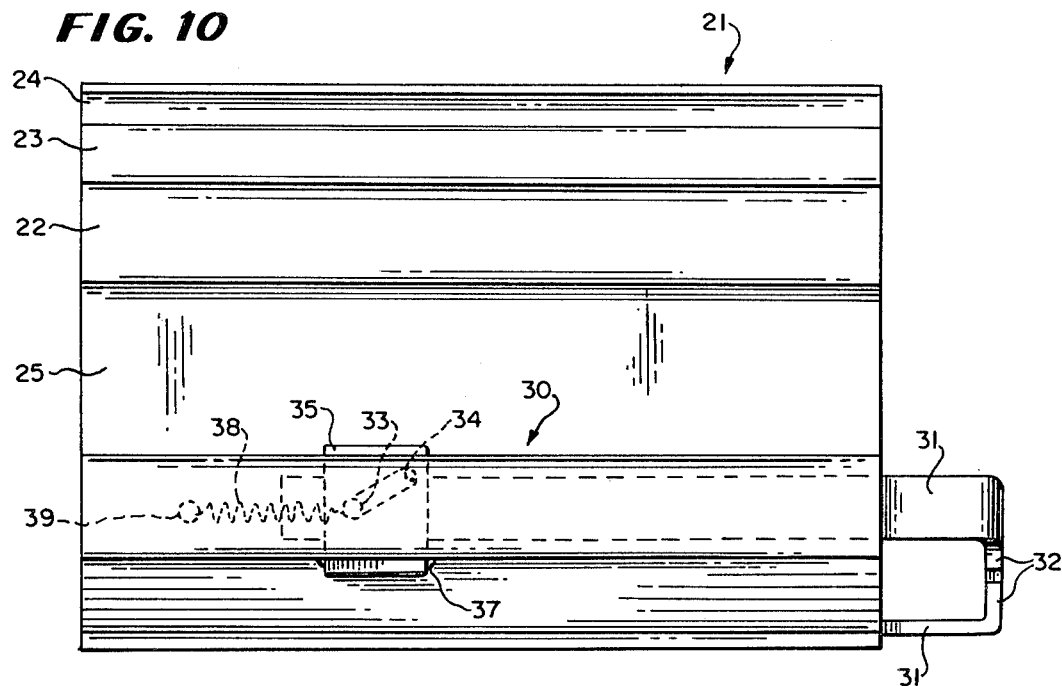
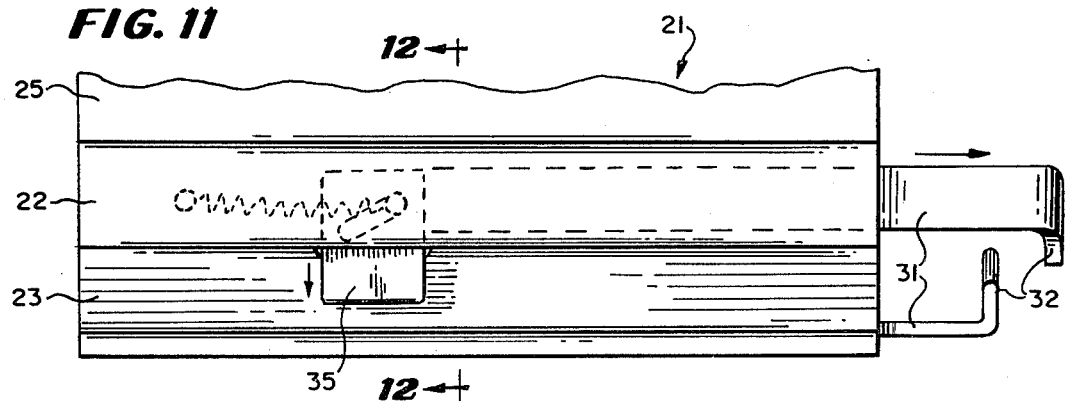
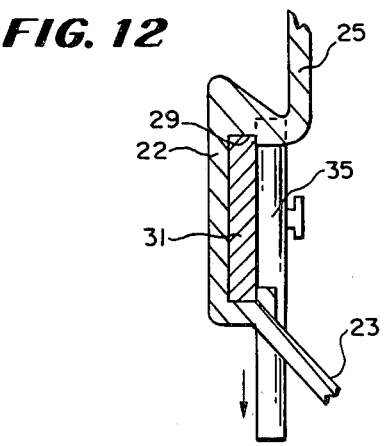
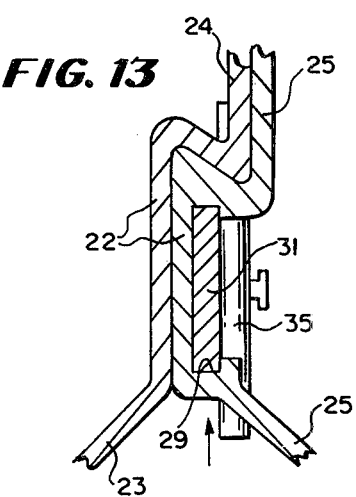

MODULAR FLASH SYSTEM

BACKGROUND OF THE INVENTION

The present invention relates to photographic flash equipment and, in particular, to electronic flash equipment of the type designed for professional use.

Currently, various types of professional, high power, electronic photographic flash equipment exist. This equipment typically includes one or more independently-supported separate flash units, which may be interconnected for simultaneous firing. The user can vary the light intensity on the subject by changing the type or configuration of the reflector shell used with a flash unit. Also, each flash unit may include controls whereby the use can effect a limited variation in flash intensity for each unit individually. It is also possible to vary the number of flash units used, but this necessarily affects the direction of the lighting and the evenness of the light intensity at the subject, since the light is now coming from a number of spaced-apart sources rather than from a single source.

SUMMARY OF THE INVENTION

The present invention provides an improved flash system which avoids the disadvantages of prior art flash systems while affording additional structural and operating advantages.

It is a general object of this invention to provide a flash unit which is interconnectable with associated like units to form a multi-unit array which provides the even light output of a single source, thereby enabling the user to tailor the light quality to the individual subject without affecting intensity distribution.

In connection with the foregoing object, it is another object of this invention to provide a unique housing module for a flash unit which is interconnectable with other like modules.

It is another object of this invention to form a housing module of the type set forth which is of simple and economical construction.

Still another object of this invention is the provision of a housing module of the type set forth which is readily connectable to a reflector unit for the flash unit housed therein.

It is another object of this invention to provide a housing module of the type set forth which includes means for locking interconnected modules together in an assembled configuration.

It is yet another object of this invention to provide a modular flash system comprising a plurality of housing modules of the type set forth, all controllable from one location.

These and other objects of the invention are attained by providing housing structure for a photographic flash unit adapted to interfit with other like flash units, the housing structure comprising: a hollow cylindrical wall member, at least one male coupling means on the outside of the wall member, and at least one female coupling means on the outside of the wall member, the male coupling means being complementary to the female coupling means.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a vertical sectional view of a flash unit constructed in accordance with and embodying the features of the present invention;

FIG. 2 is a view in vertical cross section taken along the line 2—2 in FIG. 1;

FIG. 3 is an end elevational view taken along the line 3—3 in FIG. 1;

FIGS. 4–7 are diagrammatic front elevational views of different system arrays of flash units and empty housing modules constructed in accordance with the present invention;

FIG. 10 is a side elevational view of one of the housing modules of the present invention, illustrating the latch assemblies in their latching condition;

FIG. 11 is a fragmentary view similar to FIG. 10 and illustrating one of the latch assemblies in its release condition;

FIG. 12 is an enlarged, fragmentary view in vertical section taken along the line 12—12 in FIG. 11; and FIG. 13 is a view similar to FIG. 12 illustrating the housing module interconnected with an adjacent housing module and with the latch assembly in its locking condition.

DESCRIPTION OF THE PREFERRED EMBODIMENT

Figure 8:
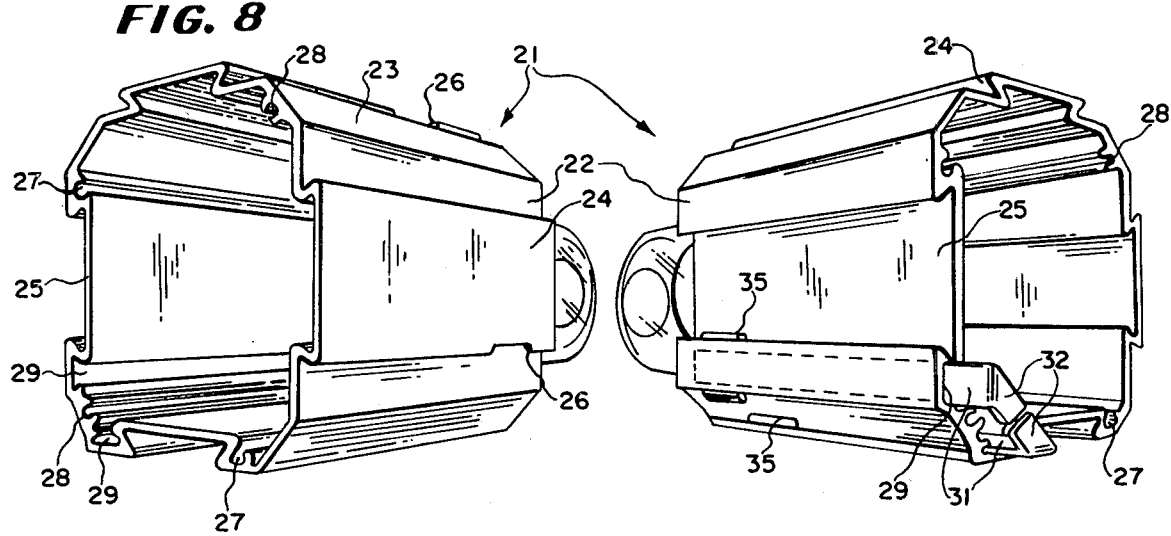
FIG. 8 is a perspective view of two empty housing modules of the present invention prior to interconnection thereof.

Referring now to FIGS. 1 through 3 of the drawings, there is disclosed an electronic photographic flash unit, generally designated by the numeral 20, constructed in accordance with and embodying the features of the present invention. The flash unit 20 includes an elongated, hollow, cylindrical housing 21 which is of one-piece, unitary construction, preferably being fiormed of extruded aluminum, although other suitable materials could be used. The housing 21 is generally square in transverse cross-sectional outline with the corners truncated, the housing 21 having four rectangular side walls 22 interconnected by four rectangular corner walls 23. Respectively formed on two adjacent ones of the side walls 22 are two outwardly projecting coupling tongues 24, each being dovetailed in transverse cross section and extending longitudinally of the associated side wall 22 substantially the entire length thereof centrally thereof. Each of the other two side walls 22 has formed thereon a coupling groove 25 dovetailed in transverse cross section and extending longitudinally of the associated side wall 22 substantially centrally thereof, each of the grooves 25 being complementary to the tongues 24.

Each of the tongues 24 projects laterally outwardly from the associated side wall 22 and has formed in the side edge thereof adjacent to one end thereof a generally rectangular keeper slot 26. Referring also to FIG. 8 of the drawings, each of the side walls 22 carrying a groove 25 has formed on the inner surface thereof an elongated channel 27, part-circular in transverse cross section, and extending longitudinally the entire length of the housing 21, the channels 27 being respectively disposed along the non-adjacent edges of the corresponding side walls 22. Formed respectively on the inner surface of the corner wall 23 between the coupling grooves 25 and on the inner surface of the opposite corner wall 23, are two channels 28, each being part-circular in transverse cross section and extending substantially the entire length of the housing 21. Respectively formed in the inner surfaces of the two side walls 22 carrying the coupling grooves 25 are two elongated flat channels 29, each being generally C-shaped in transverse cross section and extending the entire length of the housing 21, the two channels 29 being respectively disposed along the adjacent edges of the corresponding side walls 22.

Referring now also to FIGS. 10 through 12 of the drawings, each housing 21 includes two latch assemblies, each generally designated by the numeral 30, the latch assemblies 30 being arranged substantially as mirror images of each other so that only one will be described in detail. Each latch assembly 30 includes an elongated, flat actuator bar 31 slidably received in a corresponding one of the flat channels 29 and projecting a predetermined distance outwardly beyond one end of the housing 21, the actuator bar 31 being provided at is outer end with an inturned tab 32 which provides a handle. Carried by the actuator bar 31 adjacent to the inner end thereof and projecting inwardly therefrom substantially normal thereto is a pin 33 which has an enlarged head, the shank of the pin 33 extending through an elongated oval slot 34 formed in a latch plate 35. The latch plate 35 is rectangular in shape, having the longitudinal axis thereof disposed substantially perpendicular to that of the actuator bar 31, the latch plate 35 having one end thereof projecting through an aperture 36 in the adjacent corner wall 23 and having the other end thereof projecting through an aperture 37 in the side of the adjacent coupling groove 25, the apertures 36 and 37 cooperating to define a passage in which the latch plate 35 is slidably movable. The slot 34 has the long dimension thereof inclined with respect to the longitudinal axis of the latch plate 35. Fixedly secured to the pin 33 is one end of a helical tension spring 38, the other end of which is secured to a pin 39 carried by the housing 31 adjacent to the inner end of the actuator bar 31.

In operation the spring 38 resiliently holds the actuator bar 31 in a normal retracted position, illustrated in FIG. 10, thereby holding the pin 33 at the inner end of the slot 34 to maintain the latch plate 35 in a latching condition wherein it projects a predetermined distance into the associated coupling groove 25. When the actuator bar 31 is pulled outwardly by the use of the tab 32 against the urging of the spring 38, the pin 33 moves outwardly along the slot 34, thereby camming the latch plate 35 downwardly, as viewed in FIG. 10, to a release condition, illustrated in FIG. 11, wherein the latch plate 35 is fully retracted from the associated coupling groove 25.

Figure 9:
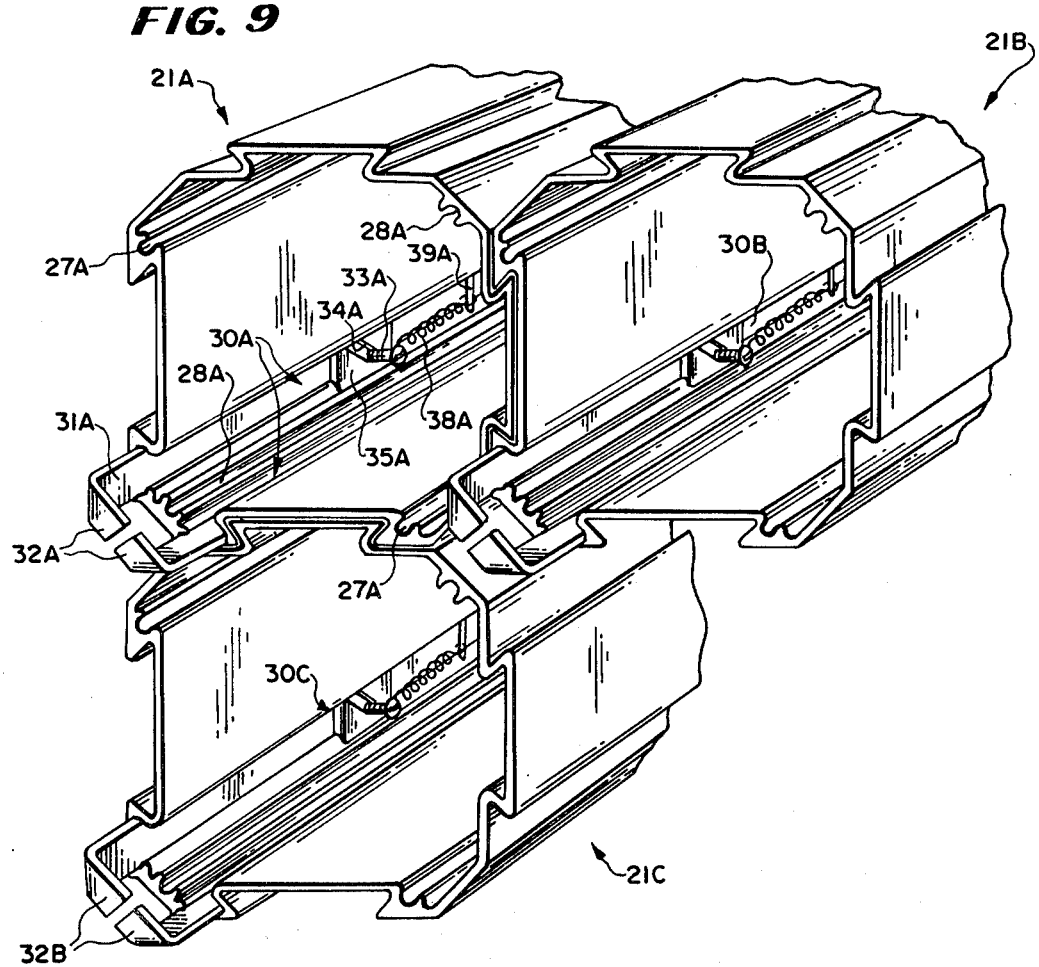
FIG. 9 is an enlarged, fragmentary, perspective view of an interconnected assembly of three empty housing modules of the present invention.

Referring in particular to FIGS. 8 and 9 of the drawings, it is a significant aspect of the present invention that the housing 21 is so constructed as to constitute a module such that a number of like modules can be readily interconnected. In this regard, it will be appreciated that each of the latch plates 35 is so constructed as to be matingly receivable in the keeper slots 26 of the coupling tongues 24. In the preferred embodiment, the latch plates 35 and the keeper slots 26 have been illustrated as disposed adjacent to one end of the housing 21, which will be referred to as the front end to facilitate the description, although it will be appreciated that the latch assemblies 30 could be disposed at any point along the length of the housing 21.

Referring to FIG. 9, when two of the housings 21A and 21B are to be interconnected, the front end of one of the coupling tongues 24A on one of the housings 21A is inserted in the rear end of a coupling groove 25B on the other housing 21B and slid therealong until the front end of the coupling tongue 24A engages the latch plate 35B of the associated latch assembly 30B. Then, the actuator bar 31B is pulled out rearwardly of the housing 21B (to the right, as viewed in FIG. 11), thereby retracting the latch plate 35B to its release condition and permitting the coupling tongue 24A to slide the rest of the way along the coupling groove 25B. The actuator bar 31B can then be released, and when the front and rear ends of the housings 21A and B are substantially flush, the latch plate 35B will move back to its latching condition, under the urging of the spring 38B, into engagement in the keeper slot 26A of the coupling tongue 24A, thereby securely interlocking the two housings 21A and B. It will be appreciated that another housing 21C can then be joined to the interconnected housings 21A and 21B and, in like manner, any number of the housings 21 can be interconnected in any desired configuration. When it is desired to disconnect two of the housings 21 from each other, the actuator bar 31 of the latch assembly 30 at the interconnection location is again pulled rearwardly to move the associated latch plate 35 to its retracted position, thereby permitting the two housings 21 to be slid apart.

In each of the flash units 20, the rear end of the housing 21 is closed by a rear panel, generally designated by the numeral 40, and illustrated in FIG. 3. The rear panel 40 is shaped complementary to the housing 21 and is adapted to fit over the rear end thereof, screw apertures 41 being provided for receiving suitable screws therethrough for threaded engagement with inserts (not shown) respectively received in the channels 28 of the housing 21 securely to fasten the rear panel 40 in place. Disposed on the rear panel 40 and projecting rearwardly therefrom are two reflector locks 42 (see FIG. 1) which are receivable in complementary apertures in an associated reflector (see FIGS. 4-7) for holding it in a mounted position on the flash unit 20. Each reflector lock 42 is fixedly secured to one end of an elongated actuator rod 43 which is disposed in a corresponding one of the channels 27 and terminates in a handle portion which projects forwardly of the front end of the housing 21. Each of the reflector locks 42 is spring-biased to a an unlocked position disposed against the rear panel 40 and is movable by rearward depression of the associated actuator rod 43 for insertion through a complementary opening in the associated reflector, the actuator rod 43 then being rotatable to move the reflector lock 42 to a locked position wherein it cannot pass through the aperture in the reflector.

The rear panel 40 has formed therein a plurality of elongated ventilation slots 44 for accommodating a flow of air through the housing 21. Mounted on the rear panel 40 are a number of control devices for the flash unit 20, including a power switch 45, three thumb wheel switches 46 and four selector switches 47. The thumb-wheel switches 46 can serve as address selectors for dialing in the address number for the particular flash unit when it is used in conjunction with other such units and a control terminal. Alternatively, the thumb-wheel switches 46 can be used to select other operational features. The selector switches 47 control other operational functions on the flash unit 20. Also mounted on the rear panel 40 are an input AC power and data plug 48 and an output AC power and data plug 49 for providing interconnection between the circuitry of the flash unit 20 and associated equipment such as other flash units, a control unit and the like, as well as to the power mains.

Disposed within the housing 21 is the flash circuitry, generally designated by the number 50, which is mounted on a number of circuit boards. More specifically, there are provided adjacent to the rear end of the housing 21 a stack of four circuit boards including a logic power supply and manual control board 51, a microprocessor board 52, a signal processing board 53 and a line voltage tripler board 54. The boards 51-54 are separated by aligned spacers 56 through which are received suitable fasteners 55 securely to fasten the stack of boards 51-54 to the rear panel 40. There are also provided adjacent to the front end of the housing 21 three main flash capacitor boards 57 which are secured by fasteners 58 and suitable spacers 59 to a front panel 60 which closes the front end of the flash unit 20 (see FIG. 1).

The front panel 60 may be secured to the housing 21 in much the same manner as is the rear panel 40, the front panel 60 being provided with a forwardly projecting fan shroud 61 which encloses a ventilation fan 62 for drawing air forwardly through the ventilation slots 44 in the rear panel 40 and exhausting it through complementary openings (not shown) in the fan shroud 61. Mounted on the outer surface of the fan shroud 61 are three flash tubes 63, each being connected as by connectors 64 to a corresponding group of flash capacitors 69 on the capacitor boards 57. Also mounted on the fan shroud 61 centrally thereof is a socket 65 for receiving therein a modelling lamp bulb 66. Secured to the fan shroud 61 and cooperating therewith to enclose the flash tubes 63 and the modelling lamp bulb 66 is a hollow transparent cover 67 which may be made of suitable heat-resistant material such as Pyrex or the like. The cover 67 is provided with a ventilation aperture 68 in the front end thereof centrally thereof. Thus, it will be appreciated that the stream of air generated by the fan 62 is directed through the cover 67 for cooling the flash tubes 63 and the modelling lamp bulb 66.

It is a significant aspect of the present invention that the unique modular construction of the flash units 20, and in particular the housings 21 thereof, permits assembly of the housings 21 in different configurations for providing different system arrays of flash units 20. More specifically, the present invention permits the flash units 20 to be arrayed in configurations which effect an even light intensity simulating a single source. Several possible arrays are disclosed in FIGS. 4 through 7. In FIG. 4 there is illustrated an array 80 comprising four of the flash units 20 disposed, respectively, at the corners of a square configuration, each side of the square comprising three empty housings 21 which serve simply as spacers, the empty housings 21 and the flash units 20 all being interconnected in the manner described above.

Mounted on the rear of each of the flash units 20 is an enlarged substantially square reflector 81, dimensioned so that the four reflectors 81 have their adjacent edges meeting for cooperation to form a single large square reflector for the array 80.

In FIG. 5 there is illustrated another array, generally designated by the numeral 90, which includes a rectangular configuration of flash units 20 alternating with empty housings 21, with four of the flash units 20 along each side of the square configuration. The array 90 also includes two rows 92 of alternating flash units 20 and empty housings 21 extending across the rectangular configuration. Each of the flash units 20 in the array 90 has attached to the rear thereof a square reflector 91, the adjacent edges of the reflectors 91 meeting to provide a single large square reflector for the array 90.

In FIG. 6 there is illustrated an array 100 comprising eight flash units 20 arranged in two contiguous rows of four. Respectively mounted on selected ones of the flash units 20 are reflectors 101 which cooperate to define a single large rectangular reflector which projects outwardly of the array 90 around the entire perimeter thereof.

In FIG. 7 there is disclosed an array 110 comprising two flash units 20 spaced apart by a row of three empty housings 21, each of the flash units 20 having secured to the rear thereof a rectangular reflector 111, the inner ends of the reflectors 111 meeting so as to provide a single large rectangular reflector for the array 110. It will be appreciated that many other configurations of flash unit arrays are possible with the flash units 20 and housings 21 of the present invention, the arrays of FIGS. 4 through 7 being described simply for purposes of illustration.

From the foregoing, it can be seen that there has been provided an improved modular electronic flash system comprising a plurality of flash units, each housed in an identical housing module, the modules being interconnectable to provide a wide assortment of user-tailorable arrays of flash units which provide even light intensity.

I claim:

1. A photographic flash unit adapted to interfit with other like flash units, said flash unit comprising: housing structure including a hollow wall member, at least one male coupling means on the outside of said wall member, and at least one female coupling means on the outside of said wall member, said male coupling means being complementary to said female coupling means; a flash lamp mounted on said housing structure; and power supply and control means disposed within said housing structure and coupled to said flash lamp for energization thereof.

2. The flash unit of claim 1, wherein said wall member is generally polygonal in transverse cross-sectional outline and has a plurality of side wall portions.

3. The flash unit of claim 2, wherein said wall member is generally square in transverse cross-sectional outline.

4. The flash unit of claim 1, wherein said wall member is of unitary one-piece construction.

5. The flash unit of claim 4, wherein said wall member is formed of metal.

6. The flash unit of claim 1, wherein said wall member is elongated and each of said male and female coupling means extends longitudinally of said wall member.

7. The flash unit of claim 1, wherein said male and female coupling means respectively comprise complementary tongue and groove structures.

8. The flash unit of claim 7, wherein each of said tongue and groove structures has a dovetail shape in transverse cross section.

9. The flash unit of claim 1, wherein said wall member includes two of said male coupling means and two of said female coupling means, said four coupling means being substantially equiangularly spaced apart about the circumference of said wall member.

10. The flash unit of claim 9, wherein said two male coupling means are disposed adjacent to each other and said two female coupling means are disposed adjacent to each other.

11. A modular flash system including an array of a plurality of photographic flash units comprising: a plurality of interconnected housing modules, each of said housing modules including a hollow wall member, at least one male coupling means on the outside of said wall member having a first retaining portion, at least one female coupling means on the outside of said wall member having a second retaining portion, said male coupling means being complementary to said female coupling means, selected ones of said male coupling means being matingly engaged respectively with female coupling means on adjacent housing modules with said first and second retaining portions being disposed in interlocking engagement with each other so that one of said modules may be cantilevered from the other; and a plurality of flash devices respectively disposed in at least selected ones of said housing modules, each of said flash devices including a flash lamp and power supply and control means coupled to said flash lamp for energization thereof, each of said flash devices and its associated housing module forming one of said flash units.

12. The flash system of claim 11, wherein selected ones of said housing modules are empty.

13. The flash system of claim 11, wherein said wall members are identically constructed.

14. The flash system of claim 11, wherein each of said wall members is generally square in transverse cross-sectional outline, having four side wall portions.

15. The flash system of claim 14, wherein each of said male and female coupling means is disposed on a separate one of said wall portions.

16. The flash system of claim 11, wherein each of said male coupling means is slidably engageable with female coupling means on another wall member.

17. The flash system of claim 16, wherein said wall member is elongated and each of said male and female coupling means extends longitudinally substantially the entire length of said wall member.

18. The flash system of claim 11, and further including a plurality of reflectors respectively coupled to said flash units.

19. The flash system of claim 18, and further including a plurality of reflector latch means respectively associated with said flash units for releasably securing said reflectors to said flash units.

20. The flash system of claim 19, wherein each of said wall members has an elongated channel on the inner surface thereof for retaining said reflector latch means therein.

21. Housing structure for a housing module adapted to interfit with other like modules, said housing structure comprising: a hollow cylindrical wall member, at least one male coupling means on the outside of said wall member, at least one female coupling means on the outside of said wall member, said male coupling means being complementary to said female coupling means, keeper means associated with said male coupling means, and latch means associated with said female coupling means and complementary to said keeper means and movable between a latching condition and a release condition.

22. The housing structure of claim 21, wherein said keeper means comprises an aperture formed in said male coupling means, said wall member have a passage formed therein communicating with said female coupling means, said latch means comprising a latch member disposed in said passage for movement therealong with respect to said female coupling means.

23. The housing structure of claim 21, and further including manually-operated actuating means coupled to said latch means for effecting movement thereof between the latching and release conditions thereof.

24. The housing structure of claim 23, and further including bias means coupled to said actuator means for resiliently holding said latch means in the latching condition thereof.

25. The housing structure of claim 21, wherein said male and female coupling means respectively comprise complementary tongue and groove structures, said keeper means comprising an aperature in said tongue structure, said wall member having a passage therein communicating with said groove structure, said latch means comprising a latch member disposed in said passage and movable therealong into and out of said groove structure.

26. The housing structure of claim 25, wherein said latch member has a cam surface thereon, said latch means further including an actuator member having cam means disposed in camming engagement with said cam surface for effecting movement of said latch member between the latching and release conditions thereof.

27. The housing structure of claim 26, wherein said wall member includes an elongated channel on the inner surface thereof, said actuator comprising an elongated rod slidably disposed in said channel.

28. A modular flash system including an array of a plurality of photographic flash units comprising: a plurality of interconnected housing modules, each of said housing modules including a hollow wall member, at least one male coupling means on the outside of said wall member, at least one female coupling means on the outside of said wall member, said male coupling means being complementary to said female coupling means, selected ones of said male coupling means being matingly engaged respectively with female coupling means on adjacent housing modules; keeper means associated with said male coupling means; latch means associated with said female coupling means and movable between a latching condition and a release condition, said latch means in the latching condition thereof being engageable with the keeper means of a male coupling means matingly engaged with said female coupling means for preventing separation thereof, said latch means in the release condition thereof being out of engagement with the keeper means of a male coupling means matingly engaged with said female coupling means for accommodating separation thereof; a plurality of flash devices respectively disposed in at least selected ones of said housing modules, each of said flash devices and its associated housing module forming one of said flash units.

29. The flash system of claim 28, wherein selected ones of said housing modules are empty.

30. The flash system of claim 28, and further including a plurality of reflectors respectively coupled to said flash units.

31. The flash system of claim 28, wherein each of said wall members is generally square in transverse cross-sectional outline, having four side wall portions, each of said male and female coupling means being disposed on a different one of said wall portions.

32. The flash system of claim 31, wherein each of said housing modules includes two of said male coupling means and two of said female coupling means.

33. The flash system of claim 32, wherein said two female coupling means are disposed on adjacent side wall portions of said wall member, said two latch means being disposed adjacent to the same corner of said wall member.

* * * * *